US010081962B1

(12) United States Patent
Sluss

(10) Patent No.: US 10,081,962 B1
(45) Date of Patent: Sep. 25, 2018

(54) BUOYING STRUCTURE AND METHOD

(71) Applicant: Douglas Sluss, Falls Mills, VA (US)

(72) Inventor: Douglas Sluss, Falls Mills, VA (US)

(*) Notice: Subject to any disclaimer, the term of this patent is extended or adjusted under 35 U.S.C. 154(b) by 0 days.

(21) Appl. No.: 15/793,677

(22) Filed: Oct. 25, 2017

(51) Int. Cl.
E02D 27/04 (2006.01)
E04H 9/14 (2006.01)
E04B 1/343 (2006.01)
E02D 27/06 (2006.01)

(52) U.S. Cl.
CPC ............ *E04H 9/145* (2013.01); *E02D 27/06* (2013.01); *E04B 1/34352* (2013.01)

(58) Field of Classification Search
CPC . E02D 27/36; E02D 27/06; B63B 2035/4426; B63B 21/50; B63B 35/732; B63B 35/44; Y02A 30/21; E02B 3/064; E04H 9/145
See application file for complete search history.

(56) References Cited

U.S. PATENT DOCUMENTS

| | | | | | |
|---|---|---|---|---|---|
| 2,715,756 | A | * | 8/1955 | Carver | E04H 9/145 405/229 |
| 5,347,949 | A | * | 9/1994 | Winston | B63B 35/44 114/264 |
| 5,647,693 | A | * | 7/1997 | Carlinsky | B63B 35/44 405/229 |
| 6,073,573 | A | * | 6/2000 | Gruber | B63B 1/04 114/264 |
| 6,347,487 | B1 | * | 2/2002 | Davis | E04H 9/145 52/1 |
| 7,607,864 | B2 | * | 10/2009 | Kenady | B63B 21/50 405/229 |
| 8,011,159 | B1 | | 9/2011 | Saebi | |
| 9,238,920 | B1 | * | 1/2016 | Carlinsky | E04H 9/145 |
| 2004/0261338 | A1 | * | 12/2004 | De Cherance | E02D 27/36 52/292 |
| 2006/0029470 | A1 | * | 2/2006 | Berlin | E02L 33/06 405/4 |
| 2006/0191460 | A1 | * | 8/2006 | Zeilinger | E02B 3/064 114/264 |
| 2013/0087089 | A1 | * | 4/2013 | Lill | B63B 21/00 114/263 |
| 2013/0199113 | A1 | * | 8/2013 | Nelson | B63B 35/44 52/169.1 |
| 2015/0121778 | A1 | * | 5/2015 | Rawding | E04H 9/145 52/169.9 |
| 2015/0247333 | A1 | * | 9/2015 | Padtsialezhnikau | E04H 9/145 114/265 |
| 2015/0322642 | A1 | * | 11/2015 | Wu | E02L 317/025 405/8 |
| 2017/0321444 | A1 | * | 11/2017 | Henderson | E04H 9/028 |

* cited by examiner

*Primary Examiner* — Gisele D Ford
(74) *Attorney, Agent, or Firm* — Integrity Patent Group, PLC; Edwin Wold

(57) ABSTRACT

A buoying system includes an anchor, a plurality of vertical supports, a plurality of support mounts, and at least one floatation device. The anchor is affixed to the ground, and the plurality of vertical supports are affixed to the anchor. The anchor may comprise a plurality of anchors. The plurality of support mounts is affixed to the housing structure and are constrained laterally by the plurality of vertical supports. The floatation device is configured to elevate the housing structure above the ground in response to water reaching a predetermined lever as a result of a flood event.

18 Claims, 5 Drawing Sheets

BUOYING STRUCTURE AND METHOD

CROSS-REFERENCE TO RELATED APPLICATION(S)

The present application is related to and claims priority to U.S. Provisional Patent Application No. 62/379,704 filed Aug. 25, 2016, which is incorporated by reference herein in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

TECHNICAL FIELD

The present invention relates generally to the field of structures of existing art and more specifically relates to adaptive structures.

RELATED ART

In populated areas, flooding can be a catastrophic event causing loss of life, disruption of power sources, reduction in mobility, and damage to buildings and other structures. Disasters such as hurricanes, levee failures, and seasonal weather can cause massive amounts of damage to structures in populated areas, displacing homeowners and resulting in large financial costs. Traditional buildings are not designed to be submerged, and may suffer irreparable damage during flooding conditions. Even if a structure remains intact following a flood, the resulting water damage may jeopardize the long-term integrity of the housing structure, destroy drywall, cause mold, and cause concrete to crack. In some cases, the cost of repairing the structure may be more than the cost of replacing it. A suitable solution is desired.

U.S. Pat. No. 8,011,159 to Nasser Saebi relates to a method of providing a floating house. The described method of providing a floating house includes a composite building that will float if the building site is flooded. The house and base will float/slide up and down on posts if flooding of the building site occurs. The posts are secured in the ground at the site by suitable methods, such as a poured concrete ball around the bottom of the post.

SUMMARY OF THE INVENTION

In view of the foregoing disadvantages inherent in the known adaptive structures art, the present disclosure provides a novel buoying structure and method. The general purpose of the present disclosure, which will be described subsequently in greater detail, is to provide an efficient and effective buoying structure and method.

A buoying system for buoying a housing structure during a flood is disclosed herein. The buoying system includes an anchor, a plurality of vertical supports, a plurality of support mounts, and at least one floatation device. The anchor is affixed to the ground, and the plurality of vertical supports are affixed to the anchor. The anchor may comprise a plurality of anchors. The plurality of support mounts is affixed to the housing structure and is constrained laterally by the plurality of vertical supports. The floatation device is a buoyant structure attached to the underside of the housing structure which elevates the housing structure above the ground during a flood event when the water reaches a predetermined level. The structure may be one of a variety of building types, such as houses, out buildings, carports, or other structures.

According to another embodiment, a method of buoying a structure is also disclosed herein. The method of buoying a structure includes firstly, providing the buoying system; secondly, exerting a buoyant force upwardly against the housing structure as the floatation devices are submerged in water during the flood event; thirdly, sliding the vertical supports within the support mounts such that the housing structure rises relative to the anchor as the water level rises; and fourthly, contracting the plurality of vertical supports within the support mounts such that the housing structure lowers relative to the anchor as the water level decreases.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a buoying structure and method, constructed and operative according to the teachings of the present disclosure.

The various embodiments of the present invention will hereinafter be described in conjunction with the appended drawings, wherein like designations denote like elements.

DETAILED DESCRIPTION

Figure 1A:
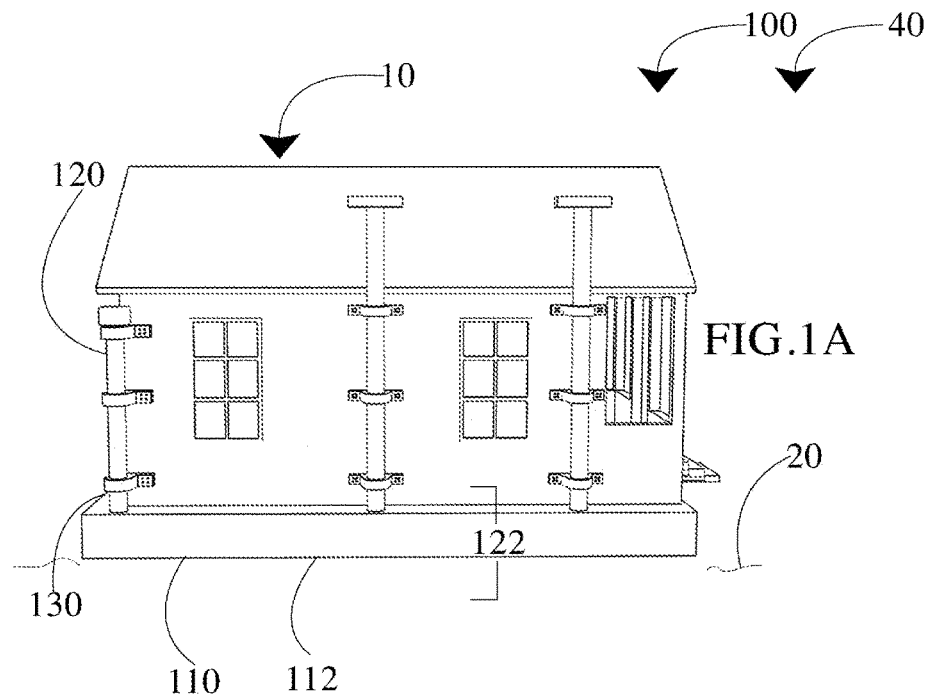
FIG. 1A is a perspective view of the buoying system during an 'in-use' condition, according to an embodiment of the disclosure.

As discussed above, embodiments of the present disclosure relate to an adaptive structure and more particularly to a buoying structure and method as used to improve the longevity of a housing structure, which may include outdoor buildings, storage buildings, double wides, mobile home trailers, and the like.

Generally speaking, the buoying system provides a mechanism for buoying a housing structure above water during a flood event. The buoying system may include a plurality of vertical supports, an anchor affixing the plurality of vertical supports to the ground, a plurality of support mounts affixing the vertical supports to the housing structure, and at least one floatation device affixed to the housing structure. The plurality of support mounts may slide freely along the vertical supports, such that when the floatation devices exert a buoyant force against the housing structure, the housing structure is able to rise along the vertical supports. The vertical supports are of sufficient stiffness to prevent lateral movement of the housing structure during a flood event. The diameter of the vertical supports may vary. Preferably, the vertical supports are sized to correspond to the size and weight of the house, such that the vertical supports are of suitable strength to support the housing structure for extended periods of time. The quantities of vertical supports may vary. The vertical supports may be affixed to the anchor by a variety of means. In some embodiments, the anchor comprises a foundation. Preferably, the floatation devices comprise pontoons attached to an underside of the housing structure. In some embodiments, the floatation devices may rest within a cavity within the anchor when the housing structure is at rest in its lowest position. Additional features of the buoying system may comprise an access device to the structure for pedestrians and equipment, which may comprise a retractable ramp, a folding staircase, or a fixed staircase.

The buoying system may further include an emergency utility system for providing power and other utilities during a flood event. The utility system may include a cooking device, a refrigerator, a propane tank, a propane and or electric heating device, at least one solar panel configured to generate electricity, or any combination thereof. Other utilities may be included. An additional feature of the buoying housing system may include utility conduits, such as power lines and water conduits, which comprise elongated, flexible conduits which will not break when the housing structure rises. In alternate embodiments, these conduits may have automatic safety shut-offs which automatically terminate delivery of the contents of each conduit during a flood event.

In some embodiments, the vertical supports may be disposed within the walls of the housing structure. In such a configuration, there may be a plurality of vertical supports, disposed in each wall. Each vertical support may be secured by support mounts and lag bolts affixed to the interior wall studs. The buoying system may further include support plates affixed to the bottom of the housing structure where each vertical support is attached, such that the vertical support passes through an aperture disposed in the center of the support plate.

In some embodiments, telescoping vertical supports may be used for increased travel length of the housing structure relative to the anchor. In one such embodiment, the vertical supports may not extend above the roofline, being disposed underneath a soffit of the roofline such that the vertical supports do not interfere with the roof of the structure. In this way, the vertical supports may retain the full vertical range of movement. A cap may be disposed on top of the telescoping embodiment of the vertical support. Various numbers of concentric sleeves may be assembled together to form each telescoping vertical support, the number of sleeves depending on the height of articulation desired. The support mounts may comprise a similar embodiment comprising a fastening device for affixing the vertical supports to the structure. Alternatively, the support mounts may be integrated with caps affixed to the top of each telescoping vertical support. The cap may be disposed on top of the telescoping embodiment of the vertical support, and may be manufactured to be combined with the uppermost vertical mounts. In other embodiments, the buoying system may comprise a kit which may be retrofitted to various types of structures, including houses with fixed or unfixed foundations, modular homes, and mobile homes, out buildings, storage buildings and the like.

Referring now more specifically to the drawings by numerals of reference, there is shown in FIGS. 1A-4B, various views of a buoying system 100.

Figure 1B:
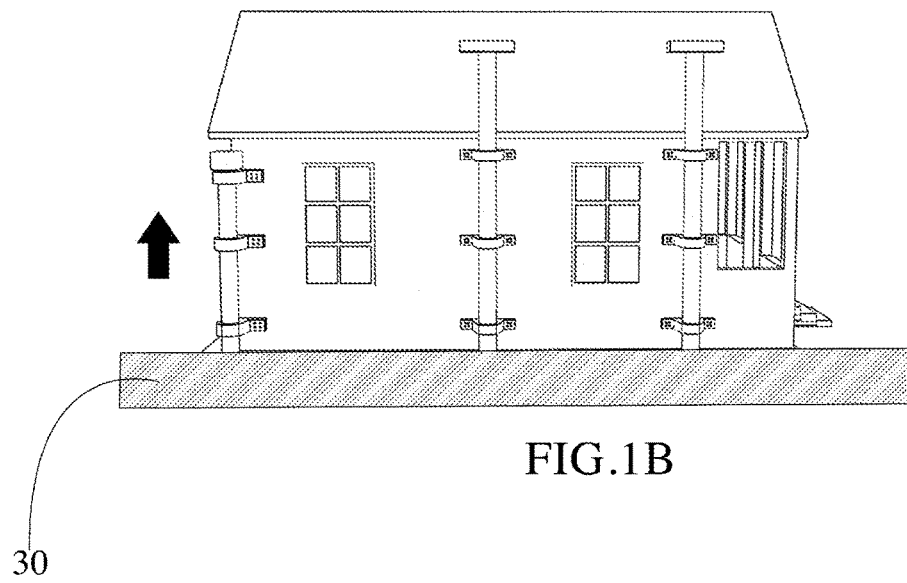
FIG. 1B is a perspective view of the buoying system during an 'in-use' condition, according to an embodiment of the disclosure.
Figure 2:
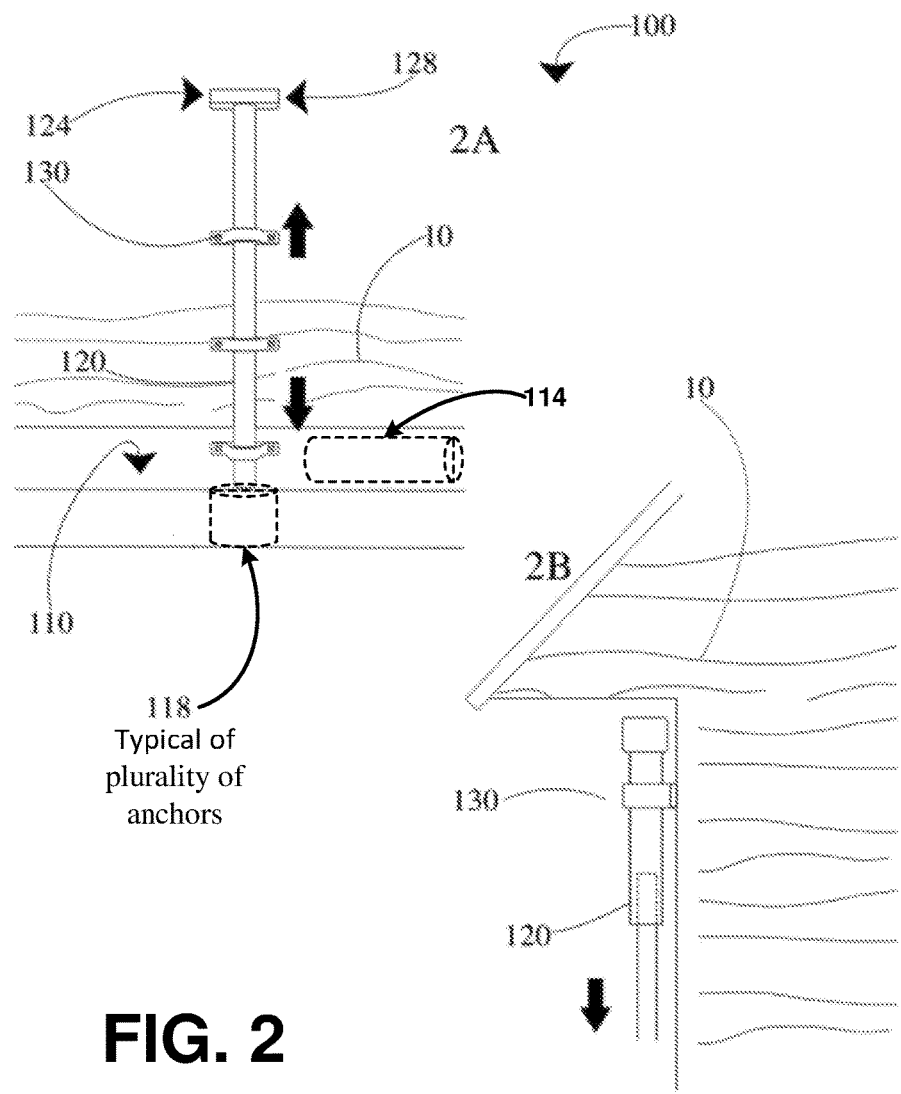
FIG. 2A is a perspective view of the buoying system of FIG. 1A, according to an embodiment of the present disclosure.
FIG. 2B is a perspective view of the buoying system of FIG. 1A, according to an embodiment of the present disclosure.

FIG. 1A-1B show buoying system 100 during an 'in-use' condition 50, according to an embodiment of present disclosure. Here, buoying system 100 may be beneficial for buoying house during flood. As illustrated, buoying system 100 100 may include an anchor 110, plurality of vertical supports 120 fixed to anchor 110, plurality of support mounts 130 fixed to housing structure 10, each support mount laterally constrained by at least one of plurality of vertical supports 120, and at least one floatation device configured to elevate housing structure 10 above ground 20 in response to water 30 from flood event 40 reaching predetermined vertical level 122. Anchor 110 is fixed to ground 20. Anchor 110 includes foundation 112 of housing structure 10 configured such that housing structure 10 is supported by the foundation 112 until water 30 from flood event 40 reaches predetermined vertical level 122. Plurality of vertical supports 120 are fixed to foundation 112. Upon reading this specification, it should be appreciated that, under appropriate circumstances, considering such issues as user preferences, design preference, structural requirements, marketing preferences, cost, available materials, technological advances, etc., other structural arrangements such as, for example, alternative flotation devices, additional utility accessories, etc., may be sufficient.

According to one embodiment, the buoying system 100 may be arranged as a kit 105. In particular, the buoying system 100 may further include a set of instructions 107. The instructions 107 may detail functional relationships in relation to the structure of the buoying system 100 such that the buoying system 100 can be used, maintained, or the like, in a preferred manner.

FIG. 2A shows buoying system 100 of FIG. 1, according to an embodiment of present disclosure. As above, buoying system 100 may include anchor 110, plurality of vertical supports 120, and plurality of support mounts 130. Plurality of support mounts 130 are configured to slide relative to at least one of plurality of vertical supports 120 in vertical direction. Plurality of support mounts 130 are configured to substantially circumscribe at least one of plurality of vertical supports 120. Plurality of support mounts 130 are fixed to at least one of plurality of vertical supports 120. Anchor 110 is distributed as plurality of dedicated anchors 118, each dedicated anchor 110 being fixed to ground 20 and coupled to at least one of plurality of vertical supports 120. Vertical lock 124 is configured to inhibit vertical motion of housing structure 10, comprising plurality of horizontally oriented plates 128 affixed to plurality of vertical supports 120. Vertical lock 124 impinges upon plurality of support mounts 130 when housing structure 10 rises to a maximum height.

FIG. 2B illustrates an alternative embodiment of buoying structure 100 of FIG. 1. Plurality of vertical supports 120 comprise telescoping supports. Plurality of vertical supports 120 are disposed beneath a soffit of structure 10. Plurality of vertical supports are affixed at an upper end to structure 10 by plurality of support mounts 130.

Figure 3A:
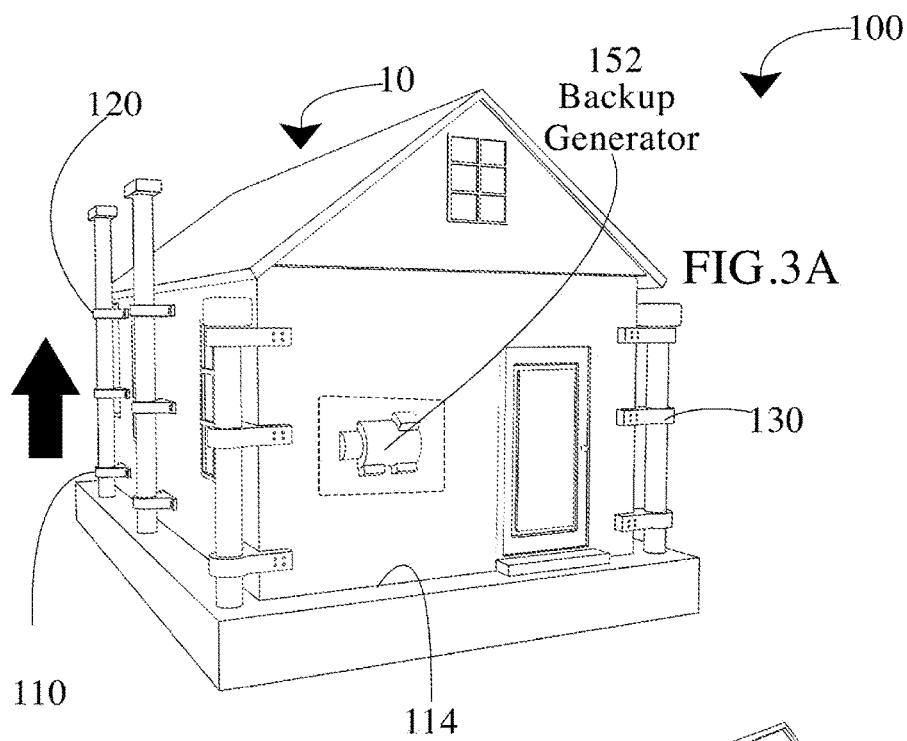
FIG. 3A is a perspective view of the buoying system of FIG. 1A, according to an embodiment of the present disclosure.
Figure 3B:
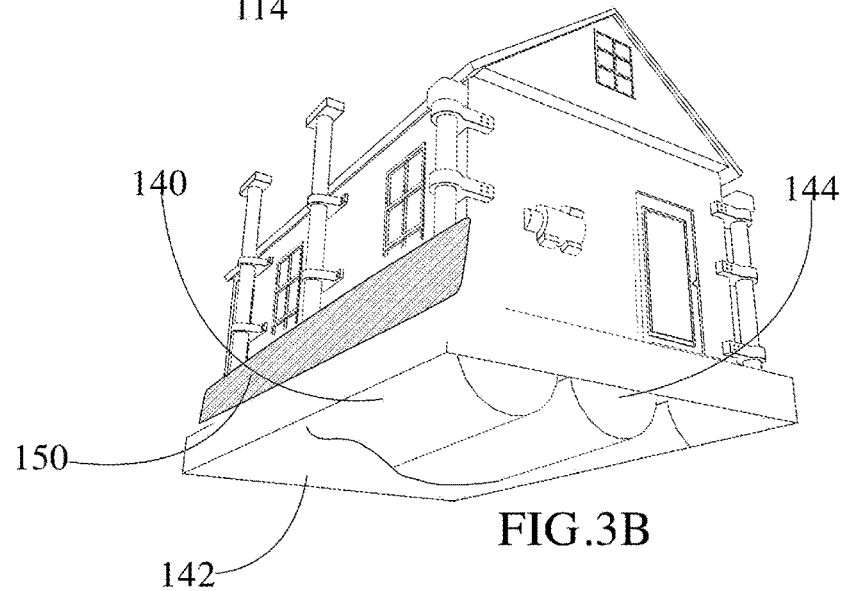
FIG. 3B is a perspective view of the buoying system of FIG. 1A, according to an embodiment of the present disclosure.

FIGS. 3A and 3B are perspective views of buoying structure 100 of FIG. 1, according to an embodiment of present disclosure. As above, buoying system 100 may include anchor 110, plurality of vertical supports 120, and plurality of support mounts 130. Buoying structure 100 further comprises water barrier 150 affixed to lower portion of housing structure 10. Water barrier 150 is configured isolate housing structure 10 from water 30 (FIG. 1) of flood event 40 (FIG. 1). Water barrier 150 preferably includes protective aluminum layer 142 affixed to lower portion of housing structure 10, such that protective aluminum layer 142 configured to provide impact protection and corrosion resistance during flood event 40 (FIG. 1). Anchor 110 further includes cavity 114 configured to receive at least one floatation device plurality of floatation devices 140. At least one floatation device 140 includes plurality of pontoons 144. Buoying system 100 further includes emergency backup sub-system 152 configured to provide emergency backup services during flood event 40 (FIG. 1).

Figure 4A:
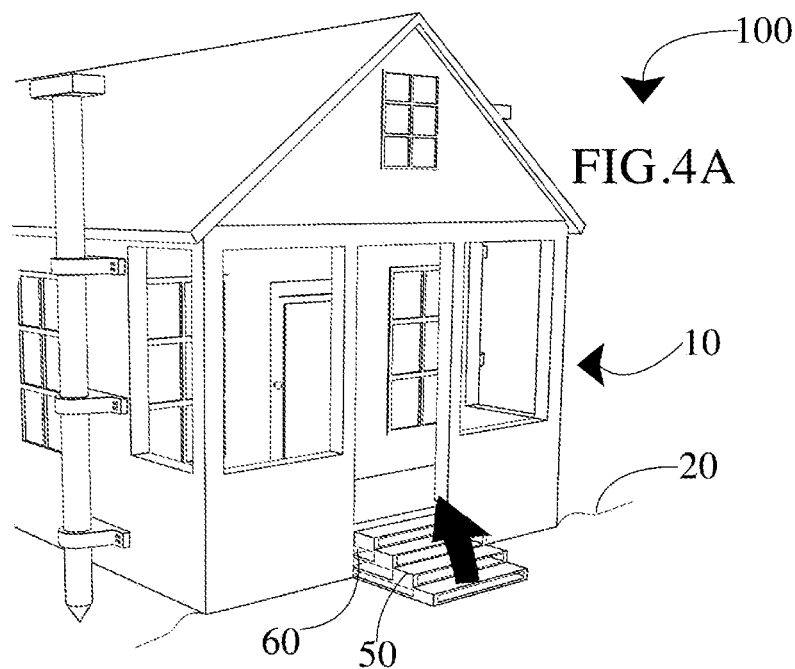
FIG. 4A is a perspective view of the buoying system of FIG. 1A, according to an embodiment of the present disclosure.

FIG. 4A is a perspective view of buoying structure 100 of FIG. 1, according to an embodiment of present disclosure. Buoying system 100 further comprises access ramp 134 having deployed state 50 and stowed state 60, said access ramp 134 configured to provide pedestrian access, wheelchair access, and equipment access to housing structure 10. Access ramp 134 may provide access to housing structure 10 when said housing structure 10 is elevated above ground 20 and may also provide access when housing structure 10 is not elevated above ground 20.

Figure 4B:
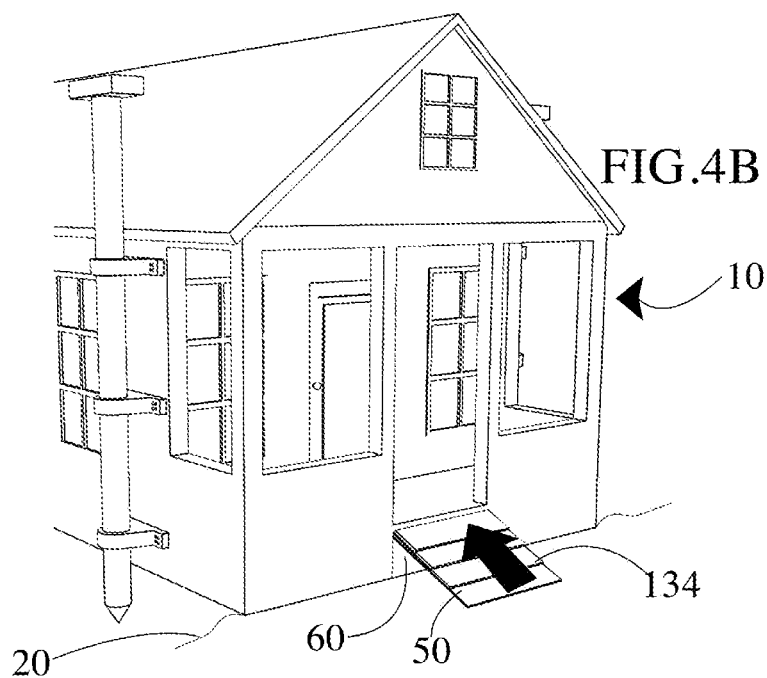
FIG. 4B is a perspective view of the buoying system of FIG. 1A, according to an embodiment of the present disclosure.

FIG. 4B is a perspective view of buoying structure 100 of FIG. 1, according to an alternative embodiment of present disclosure. Access ramp 134 (FIG. 4A) comprises a stairwell is configured to form steps 136 in deployed state 50 and to collapse in stowed state 60, steps 136 being configured to provide pedestrian access, wheelchair access, and equipment access to housing structure 10. Steps 136 may provide access to housing structure 10 when said housing structure 10 is elevated above ground 20 and may also provide access when housing structure 10 is not elevated above ground 20.

Figure 5:
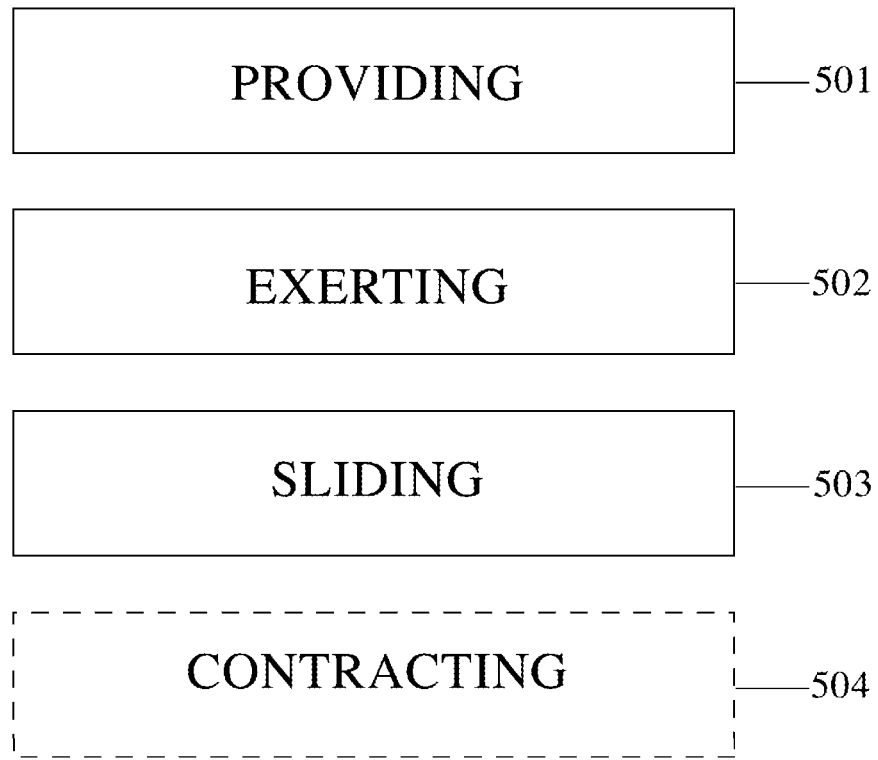
FIG. 5 is a flow diagram illustrating a method of use for buoying a housing structure, according to an embodiment of the present disclosure.

FIG. 5 is a flow diagram illustrating a method for buoying a housing structure, according to an embodiment of the present disclosure. In particular, the method for buoying a housing structure 500 may include one or more components or features of the buoying system 100 as described above. As illustrated, the method for buoying a housing structure 500 may include the steps of: step one 501, providing a system for buoying a housing structure above a ground surface during a flood event, the system comprising an anchor fixed to the ground; a plurality of vertical supports fixed to the anchor; a plurality of support mounts fixed to the housing structure, each support mount laterally constrained by at least one of the plurality of vertical supports; and at least one floatation device configured to elevate the housing structure above the ground in response to water from the flood event reaching a predetermined vertical level; step two 502, exerting a buoyant force upwardly against the housing structure as the floatation devices are submerged in water; step three 503, sliding the plurality of vertical supports within the plurality of support mounts to enable vertical movement of the housing structure relative to the anchor as the housing structure raises with the water; and step four 504, contracting the plurality of vertical supports within the support mounts to enable vertical movement of the housing structure relative to the anchor as the housing structure lowers with the water.

It should be noted that step 504 is an optional step and may not be implemented in all cases. Optional steps of method of use 500 are illustrated using dotted lines in FIG. 5 so as to distinguish them from the other steps of method of use 500. It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for buoying a housing structure, are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A system for buoying a housing structure above a ground surface during a flood event, the system comprising:
    an anchor fixed to the ground;
    a plurality of vertical supports fixed to the anchor;
    a plurality of support mounts fixed to the housing structure, each support mount laterally constrained by at least one of the plurality of vertical supports;
    a housing structure comprising a lower portion;
    a water barrier comprising:
        a protective aluminum layer affixed to said lower portion of said housing structure, said protective aluminum layer structured and arranged to provide impact protection and corrosion resistance during a flood event;
    an emergency backup sub-system configured to provide emergency backup services during the flood event, said emergency backup sub-system comprising:
        a heating device;
        a cooking device;
        a refrigerator;
        a propane tank configured to provide fuel to said heating device and said cooking device; and
        at least one solar panel configured to generate electricity for powering said refrigerator; and
    at least one floatation device configured to elevate the housing structure above the ground in response to water from the flood event reaching a predetermined vertical level.

2. The system of claim 1, wherein the plurality of support mounts is configured to slide relative to the at least one of the plurality of vertical supports in a vertical direction.

3. The system of claim 2, wherein the plurality of support mounts are configured to substantially circumscribe the at least one of the plurality of vertical supports.

4. The system of claim 1, wherein the plurality of support mounts are fixed to the at least one of the plurality of vertical supports; and
wherein the plurality of vertical supports is configured to telescope in the vertical direction.

5. The system of claim 1, further comprising a water barrier affixed to a lower portion of the housing structure, and configured to isolate the housing system water conduits from the water from the flood event.

6. The system of claim 1, wherein the anchor is distributed as a plurality of dedicated anchors, each dedicated anchor fixed to the ground and coupled to at least one of the plurality of vertical supports.

7. The system of claim 1, wherein the anchor includes a foundation of the housing structure configured such that the housing structure is supported by said foundation until water from the flood event reaches the predetermined vertical level; and
wherein the plurality of vertical supports is fixed to the foundation.

8. The system of claim 7, wherein the foundation further includes a cavity configured to receive the at least one floatation device.

9. The system of claim 1, further comprising a vertical lock configured to inhibit vertical motion of the housing structure comprising a plurality of horizontally oriented plates affixed to the plurality of vertical supports.

10. The system of claim 9, wherein the vertical lock includes an underside configured to impinge upon the plurality of support mounts when the housing structure rises to a maximum height, such that the plurality of support mounts may not travel past the vertical lock.

11. The system of claim 1, wherein the at least one floatation device includes a plurality of pontoons.

12. The system of claim 1, further comprising an access ramp having a deployed state and a stowed state, said access ramp configured to provide pedestrian access to the housing structure when said housing structure is elevated above the ground.

13. The system of claim 1, wherein access ramp is configured to form steps in a deployed state and to collapse into a flat panel in a stowed state.

14. The system of claim 1, further comprising a fixed staircase configured to provide pedestrian access to the housing structure when said housing structure is elevated above the ground.

15. The system of claim 1, wherein the said dedicated anchor comprises a plurality of anchors.

16. A flood-resistant structural buoying system for buoying a housing structure above a ground surface during a flood event, the system comprising:
an anchor fixed to the ground;
a plurality of vertical supports fixed to the anchor;
a plurality of support mounts fixed to the housing structure, each support mount laterally constrained by at least one of the plurality of vertical supports;
a housing structure comprising a lower portion;
a water barrier comprising:
a protective aluminum layer affixed to said lower portion of said housing structure, said protective aluminum layer structured and arranged to provide impact protection and corrosion resistance during a flood event;
an emergency backup sub-system configured to provide emergency backup services during the flood event, said emergency backup sub-system comprising:
a heating device;
a cooking device;
a refrigerator;
a propane tank configured to provide fuel to said heating device and said cooking device; and
at least one solar panel configured to generate electricity for powering said refrigerator; and
at least one floatation device configured to elevate the housing structure above the ground in response to water from the flood event reaching a predetermined vertical level;
wherein the plurality of support mounts is configured to slide relative to the at least one of the plurality of vertical supports in a vertical direction;
wherein the plurality of support mounts is configured to substantially circumscribe the at least one of the plurality of vertical supports;
wherein the plurality of support mounts is fixed to the at least one of the plurality of vertical supports; and
wherein the plurality of vertical supports is configured to telescope in the vertical direction;
wherein the flood-resistant structural buoying system further comprises a water barrier affixed to a lower portion of the housing structure, and configured isolate the housing structure water from the water from the flood event;
wherein the anchor is distributed as a plurality of dedicated anchors, each dedicated anchor fixed to the ground and coupled to at least one of the plurality of vertical supports;
wherein the anchor includes a foundation of the housing structure configured such that the housing structure is supported by said foundation until water from the flood event reaches the predetermined vertical level;
wherein the plurality of vertical supports is fixed to the foundation;
wherein the foundation further includes a cavity configured to receive the at least one floatation device plurality of floatation devices;
wherein the flood-resistant structural buoying system further comprises a vertical lock configured to inhibit vertical motion of the housing structure comprising a plurality of horizontally oriented plates affixed to the plurality of vertical supports;
wherein the at least one floatation device includes a plurality of pontoons;
wherein the flood-resistant structural buoying system further comprises an access ramp having a deployed state and a stowed state, said access ramp configured to provide pedestrian access to the housing structure when said housing structure is elevated above the ground; and
wherein the system is arranged as a kit.

17. A method of raising the structure the flood-resistant structural buoying system of claim 16 above water during a flood event, the method comprising the steps of:
exerting a buoyant force upwardly against the housing structure as the floatation devices are submerged in water; and
sliding the plurality of vertical supports within the plurality of support mounts to enable vertical movement of the housing structure relative to the anchor as the housing structure raises with the water.

18. The method of claim 17, further comprising the step of contracting for the construction of the plurality of vertical supports within the plurality of support mounts to enable vertical movement of the housing structure relative to the anchor as the housing structure lowers with the water.

\* \* \* \* \*